(12) United States Patent
Shoap

(10) Patent No.: US 11,203,023 B2
(45) Date of Patent: Dec. 21, 2021

(54) MODULAR FLUID SPRAY NOZZLES AND RELATED SYSTEMS AND METHODS

(71) Applicant: Stephen D. Shoap, Wakefield, MA (US)

(72) Inventor: Stephen D. Shoap, Wakefield, MA (US)

(\*) Notice: Subject to any disclaimer, the term of this patent is extended or adjusted under 35 U.S.C. 154(b) by 0 days.

(21) Appl. No.: 17/127,182

(22) Filed: Dec. 18, 2020

(65) Prior Publication Data

US 2021/0190241 A1 Jun. 24, 2021

Related U.S. Application Data

(60) Provisional application No. 62/974,727, filed on Dec. 20, 2019.

(51) Int. Cl.
| | |
|---|---|
| *B05B 1/20* | (2006.01) |
| *A62C 31/05* | (2006.01) |
| *A01G 25/02* | (2006.01) |
| *F16L 11/12* | (2006.01) |
| *F16L 11/20* | (2006.01) |
| *F16L 11/14* | (2006.01) |

(Continued)

(52) U.S. Cl.
CPC ............... *B05B 1/20* (2013.01); *A01G 25/02* (2013.01); *A62C 31/05* (2013.01); *A62C 3/0264* (2013.01); *A62C 33/04* (2013.01); *F16L 11/121* (2013.01); *F16L 11/14* (2013.01); *F16L 11/20* (2013.01)

(58) Field of Classification Search
CPC ...... A01G 25/02; A62C 3/0264; A62C 31/05; A62C 31/28; A62C 33/04; B05B 1/20; B05B 1/202; B05B 1/3463; B05B 15/625; B05B 1/205; F16L 1/0243; F16L 1/0246; F16L 1/06; F16L 3/1033; F16L 3/1041; F16L 55/17
USPC ............... 182/154, 186.2; 239/547, 589.1
See application file for complete search history.

(56) References Cited

U.S. PATENT DOCUMENTS

| | | | | |
|---|---|---|---|---|
| 539,797 | A | * | 5/1895 | Collins, Jr. ............ B65G 69/00 193/3 |
| 1,049,483 | A | * | 1/1913 | Hopkins .................. B05B 1/14 239/280 |

(Continued)

FOREIGN PATENT DOCUMENTS

| | | |
|---|---|---|
| CA | 2891833 | 11/2015 |
| DE | 549897 C * | 5/1932 ............. A01G 25/02 |

OTHER PUBLICATIONS

PVC and Fire. Report [online]. Envorinex, 2011 [retrieved on Mar. 24, 2021]. Retrieved from the Internet: <URL:https://envorinex.com/web_assets/docs/products/PVC%20and%20Fire.pdf> (Year: 2011).*

*Primary Examiner* — Robert K Arundale
*Assistant Examiner* — Richard K. Durden
(74) *Attorney, Agent, or Firm* — Hayes Soloway PC

(57) ABSTRACT

A modular fluid spray nozzle is constructed from an inner conduit, having a sidewall with a center hole, housed inside a center conduit that includes a window defined by a sidewall, and a flexible or rigid outer conduit wrapped around the center conduit and forming a chamber with the rectangular window. The chamber is in fluid communication with the center hole and with at least two apertures defined by the outer conduit. The inner conduit is configured to be coupled to any type of conduit material, such as PVC pipe or another modular fluid hose segment.

19 Claims, 10 Drawing Sheets

(51) Int. Cl.
*A62C 3/02* (2006.01)
*A62C 33/04* (2006.01)

(56) References Cited

U.S. PATENT DOCUMENTS

| | | | | |
|---|---|---|---|---|
| 1,343,526 | A * | 6/1920 | Smith | A47F 7/04 |
| | | | | 211/24 |
| 1,982,061 | A * | 11/1934 | Marlowe | E04G 1/34 |
| | | | | 182/186.2 |
| 1,992,203 | A * | 2/1935 | Gabrielson | B05B 15/622 |
| | | | | 248/85 |
| 2,228,031 | A * | 1/1941 | Harsch | B05B 15/658 |
| | | | | 239/598 |
| 2,716,574 | A | 8/1955 | Chase | |
| 2,743,960 | A | 5/1956 | Kamin | |
| 2,814,529 | A | 11/1957 | Arnt | |
| 3,022,016 | A * | 2/1962 | Shrewsbury | B05B 1/04 |
| | | | | 239/521 |
| 3,091,401 | A | 5/1963 | Hruby | |
| 3,567,134 | A | 3/1971 | Smith | |
| 3,746,263 | A | 7/1973 | Reeder | |
| 3,873,030 | A * | 3/1975 | Barragan | A01G 25/023 |
| | | | | 239/542 |
| 3,882,892 | A | 5/1975 | Menzel | |
| 3,901,448 | A | 8/1975 | Babin | |
| 3,979,070 | A | 9/1976 | Lemelshtrich | |
| 4,009,832 | A | 3/1977 | Tiedt | |
| 4,037,791 | A | 7/1977 | Mullett | |
| 4,094,466 | A | 6/1978 | Deromano | |
| 4,095,745 | A | 6/1978 | Christy | |
| 4,177,947 | A | 12/1979 | Menzel | |
| 4,209,133 | A | 6/1980 | Mehoudar | |
| D260,600 | S * | 9/1981 | Taylor | B60R 15/00 |
| | | | | D8/355 |
| 4,344,576 | A | 8/1982 | Smith | |
| 4,366,926 | A * | 1/1983 | Mehoudar | A01G 25/023 |
| | | | | 239/542 |
| 4,392,616 | A | 7/1983 | Olson | |
| 4,406,434 | A * | 9/1983 | Schneckloth | B60R 15/00 |
| | | | | 248/49 |
| 4,454,989 | A | 6/1984 | Alston | |
| 4,460,129 | A | 7/1984 | Olson | |
| 4,502,631 | A | 3/1985 | Christen | |
| 4,626,130 | A * | 12/1986 | Chapin | A01G 25/02 |
| | | | | 239/542 |
| 4,756,339 | A | 6/1988 | Buluschek | |
| 4,817,875 | A * | 4/1989 | Karmeli | A01G 25/023 |
| | | | | 239/542 |
| 5,015,102 | A | 5/1991 | Yamaguchi | |
| 5,027,048 | A | 6/1991 | Masrur | |
| 5,052,625 | A | 10/1991 | Ruskin | |
| 5,279,460 | A | 1/1994 | Yu | |
| 5,332,160 | A * | 7/1994 | Ruskin | A01G 25/02 |
| | | | | 239/542 |
| 5,333,793 | A | 8/1994 | Defrank | |
| 5,755,383 | A | 5/1998 | Joseph | |
| 5,957,391 | A | 9/1999 | Defrank | |
| 6,012,102 | A | 1/2000 | Shachar | |
| 6,039,270 | A | 3/2000 | Dermitzakis | |
| 6,260,769 | B1 | 7/2001 | Hoover | |
| 6,302,335 | B1 | 10/2001 | Ormiston | |
| 6,592,049 | B1 | 7/2003 | Wolput | |
| 6,991,181 | B2 | 1/2006 | Alexander | |
| 7,445,168 | B2 | 11/2008 | Ruskin | |
| 7,832,492 | B1 | 11/2010 | Eldridge | |
| 7,913,935 | B2 | 3/2011 | Einav | |
| 8,141,589 | B2 | 3/2012 | Socolsky | |
| 8,267,115 | B2 | 9/2012 | Giuffre' | |
| 8,317,111 | B2 | 11/2012 | Cohen | |
| 8,348,182 | B2 | 1/2013 | Keren | |
| 8,493,193 | B2 | 7/2013 | Louis | |
| 8,496,193 | B2 | 7/2013 | Rosenberg | |
| 8,511,586 | B2 | 8/2013 | Einav | |
| 8,550,715 | B2 | 10/2013 | Anzini | |
| 8,579,215 | B2 | 11/2013 | Zavoli | |
| 8,672,240 | B2 | 3/2014 | Masarwa | |
| 8,733,155 | B2 | 5/2014 | Hill | |
| 8,998,113 | B2 | 4/2015 | Keren | |
| 9,561,393 | B2 * | 2/2017 | Shoap | A62C 33/04 |
| 2002/0170980 | A1 | 11/2002 | Brim et al. | |
| 2003/0150940 | A1 | 8/2003 | Vildibill et al. | |
| 2004/0046045 | A1 | 3/2004 | Alexander et al. | |
| 2005/0056711 | A1 * | 3/2005 | Mee | B05B 1/205 |
| | | | | 239/565 |
| 2005/0145716 | A1 | 7/2005 | Manning et al. | |
| 2006/0043219 | A1 | 3/2006 | Raanan et al. | |
| 2006/0169805 | A1 | 8/2006 | Dabir et al. | |
| 2006/0261194 | A1 | 11/2006 | Ding et al. | |
| 2007/0074776 | A1 * | 4/2007 | Masarwa | F16L 9/17 |
| | | | | 138/124 |
| 2007/0210215 | A1 * | 9/2007 | Prest | B60R 15/00 |
| | | | | 248/80 |
| 2008/0017729 | A1 | 1/2008 | Ou-Young et al. | |
| 2008/0261194 | A1 | 10/2008 | Ding et al. | |
| 2009/0051159 | A1 | 2/2009 | Cameron et al. | |
| 2009/0078323 | A1 | 3/2009 | Davis et al. | |
| 2009/0224078 | A1 | 9/2009 | Anderson et al. | |
| 2009/0266388 | A1 | 10/2009 | Legault et al. | |
| 2011/0186658 | A1 | 8/2011 | Wuchert et al. | |
| 2013/0119154 | A1 | 5/2013 | Sawyer et al. | |
| 2013/0248616 | A1 | 9/2013 | Ensworth | |
| 2014/0007946 | A1 | 1/2014 | Koncelik, Jr. et al. | |
| 2014/0246520 | A1 | 9/2014 | Einav et al. | |
| 2015/0201568 | A1 | 7/2015 | Einav et al. | |
| 2015/0328487 | A1 * | 11/2015 | Shoap | A62C 33/04 |
| | | | | 239/1 |
| 2019/0290945 | A1 * | 9/2019 | Raymond | A62C 3/0292 |

* cited by examiner embers, 99

MODULAR FLUID SPRAY NOZZLES AND RELATED SYSTEMS AND METHODS

CROSS REFERENCE TO RELATED APPLICATION

This application claims the benefit of U.S. Provisional Application Ser. No. 62/974,727, entitled "A Standalone Spray Nozzle" filed Dec. 20, 2019, the entire disclosure of which is incorporated herein by reference.

FIELD OF THE DISCLOSURE

The present disclosure is generally related to nozzles and more particularly is related to a fluid spray apparatus with modular nozzles and related systems and methods.

BACKGROUND OF THE DISCLOSURE

Firefighters use hoses to spray water, or other fluids, onto fires in order to extinguish the fires. The water exits these hoses from a nozzle at the end of the hoses, which the firefighters can direct to an appropriate location. Non-structural fires, such as wildfires, bushfires, or grassfires, commonly have a wide front which is difficult to fight with conventional hoses. Fire fighters on the ground, or on fire trucks, can spray water onto only a small section of a wide area fire at any given moment, which may allow fires in other areas to increase. Sometimes, fire trucks can become surrounded and trapped by a fast-moving fire.

One method of stopping a grassfire or a wildfire is to create a fire break, a gap in vegetation or other combustible material that acts as a barrier to slow or stop the progress of a bushfire or wildfire. Fire breaks often have a size in the range of 10 feet wide and as long as deemed necessary, usually sufficiently long to prevent the fire from moving around the fire break. Most fire breaks are created by teams of firefighters with hand tools, which is highly labor intensive. Where possible, tractors and plows can be used to create the fire breaks, but many wildfire locations are not easily accessible. Furthermore, when using fire breaks, wildfires can quickly become large and difficult to control. Large fires create winds that blow burning embers through the air over long distances. A 10-foot fire break can be easily jumped by blowing embers, which subverts the intended purpose of the fire break.

Within the industry, some conventional devices are available to help prevent blowing embers moving past a fire break. One such device, called a water curtain, uses a conventional hose that has many simple holes that are placed close together along the length of the hose. As water is pumped through the hose, it exits each hole and is directed straight up in a vertical column. The resulting overall spray shape is that of a thin curtain, in that, the spraying water is positioned along the length of the hose, but it is only a very thin wall of water. These water curtains are rarely used because they are too thin to significantly reduce radiant heat from a fire, and because the available water is better used to wet the nearby fuels to prevent their ignition.

One technique to protect a structure, such as a building, from a wildfire is to deploy a defensive line of rotating sprinklers on tripods, and to supply these sprinklers with water using fire hoses. Setting up such a system can be very time consuming though, and the hardware required is expensive. Another technique to protect a structure is to place permanent sprinklers on the roofs or walls of the structures. This technique, unfortunately, allows the fire to get very close to the structure before encountering a spray of water or other fire resisting fluids, which subjects the structure to high temperatures from the encroaching fire. The radiant heat from a fire can be very intense and it is best to keep the fire farther away from the structure. Placing sprinklers on a structure is also not as effective as having a system located farther from the structure which can spray fluid to stop a wildfire. Thus, a heretofore unaddressed need exists in the industry to address the aforementioned deficiencies and inadequacies in current firefighting technologies.

SUMMARY

The present disclosure, and embodiments described herein, is directed toward modular fluid spray nozzles and related devices and methods. The modular fluid spray nozzles are capable of being coupled to any type of conduit material, for example, PVC piping, segments of hose, or other types of fluid conduit segments. The modular design provides advantages over other designs in that the individual modular nozzles can be attached to mix of existing conduit material to provide a broader dispersal of water to desired areas. Additionally, the modular fluid spray nozzles can have variable spacings, such as being linked directly together, as well as connected to varying lengths of conduit, to create a wall of water with different flows as required by the local fuel load and different terrain. Moreover, adding additional units of the disclosed modular fluid spray nozzles to existing conduit material can allow for increased water dispersal in targeted areas, which can lead to less water usage and waste.

DETAILED DESCRIPTION

The present disclosure and figures are directed toward modular fluid spray nozzles and related systems and methods. The modular fluid spray nozzles are capable of being coupled to conduit materials, such as existing piping or hosing, or coupled to one another. The modular fluid spray nozzle can be used to protect structures from a heat source, such as a fire, through a targeted application of water to a desired area. The modular fluid spray nozzle can be attached to piping along a roof of a house to more adequately protect the house from a fire. In other embodiments, the modular fluid spray nozzles can be deployed farther away from a house or other structure to keep the fire and its heat from coming too close to the structure. The modular fluid spray nozzles each include at least two nozzles which cause the water to exit the nozzles in a highly dispersed, uniform manner. The presently disclosed devices and methods of delivering water can utilize less water while still providing sufficient amounts of fluid to a desired area. The modular fluid spray nozzles contain no moving parts, are fast and easy to deploy, and provide an extremely low cost way to protect structures or other objects from a fire.

Figure 1:
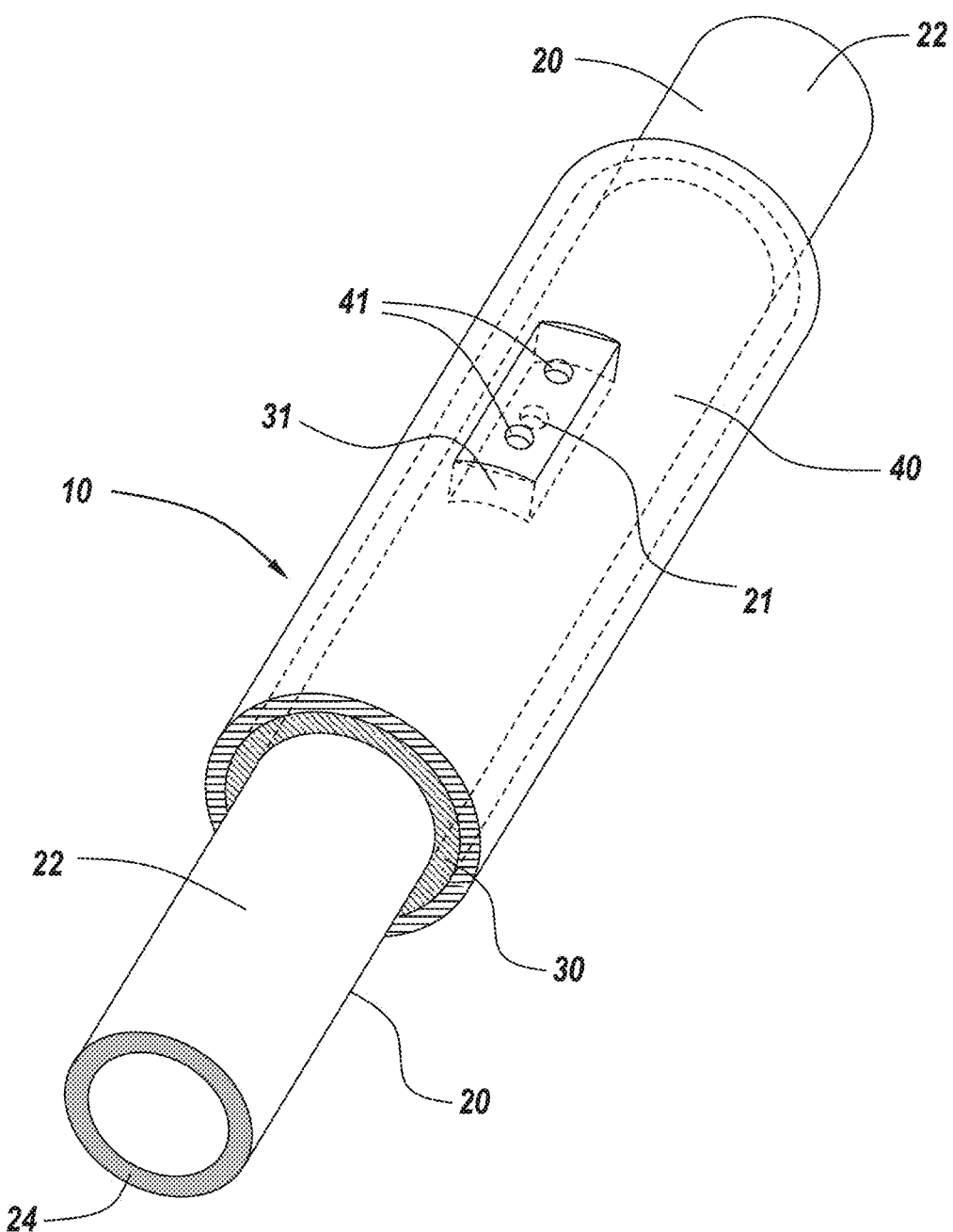
FIG. 1 is an illustration of a perspective view of components of an exemplary modular fluid spray nozzle configured in accordance with some embodiments of the subject disclosure.

FIG. 1 is an illustration of a perspective view of components that form a modular fluid spray nozzle 10 configured in accordance with the subject disclosure. In particular, FIG. 1 is an illustration of an inner hollow cylinder 20, a center hollow cylinder 30, and an outer hollow cylinder 40. When the modular fluid spray nozzle 10 is assembled, the inner hollow cylinder 20 is housed inside of, and preferably adhered to, the center hollow cylinder 30. The inner hollow cylinder 20 is sized to be a tight fit inside the center hollow cylinder 30 in the vicinity of the window 31.

When fully assembled, the outer hollow cylinder 40 is preferably sized to be a tight fit to center hollow cylinder 30, and is preferably adhered to the center hollow cylinder 30. Outer hollow cylinder 40 can be replaced by a small segment of comparable material that extends across the window 31.

Figure 2A:
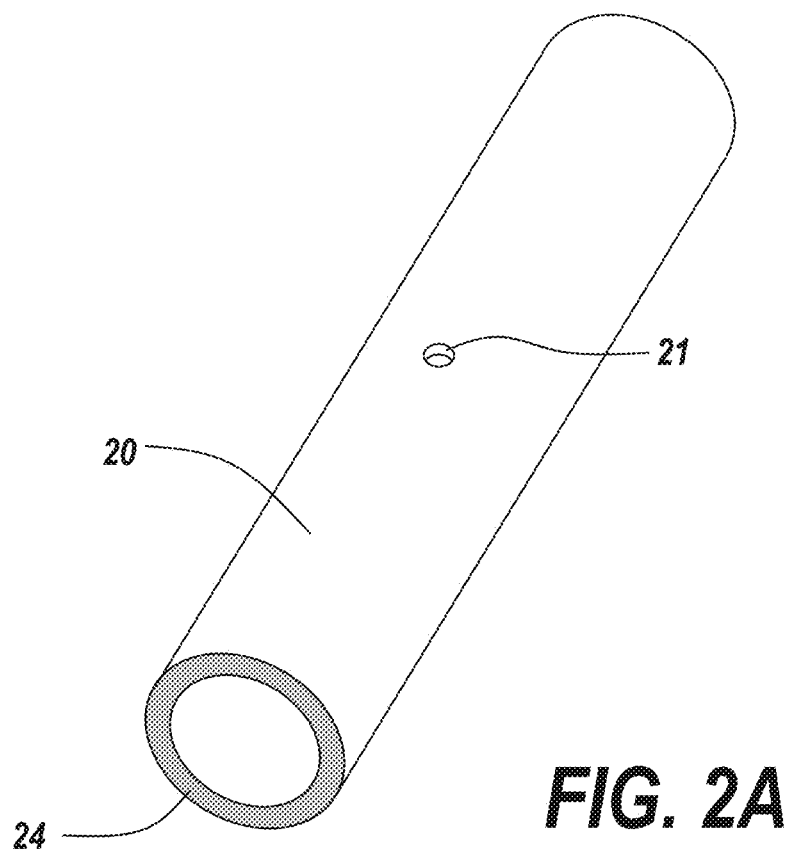
FIG. 2A is an illustration of a perspective view of an inner conduit of the modular fluid spray nozzle illustrated in FIG. 1.

As shown in FIG. 2A, inner hollow cylinder 20 has an overall cylindrical shape defined by a sidewall 24 that includes a hole 21.

Figure 2B:
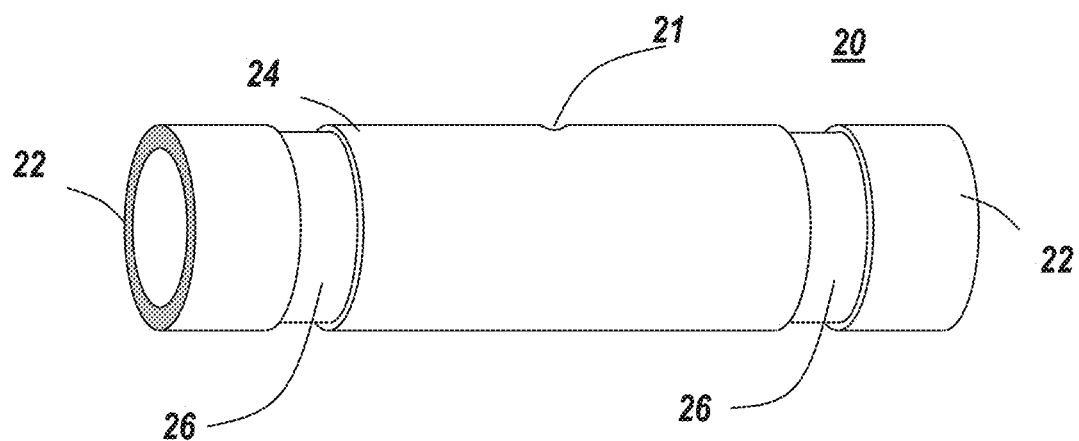
FIG. 2B is an illustration of a perspective side view of the inner conduit of FIG. 2A with notches for hose connections on each end of the inner conduit.

As shown in FIG. 1, inner hollow cylinder 20 has ends 22 that extend beyond the length of center hollow cylinder 30. In some embodiments, ends 22 may be configured to couple to different types of conduit material. For example, in some embodiments, ends 22 can be configured to be coupled to a hose. This possible embodiment is supported by FIG. 2B, which shows notches 26 on each end 22 of inner hollow cylinder 20. A hose clamp forces a hose into the notches 26 to secure the hose to inner hollow cylinder 20. The ends 22 can also be glued or adhesively bonded to PVC pipe. Ends 22 can be configured to be coupled to another modular fluid spray nozzle 10. While FIG. 2B illustrates one possible construction of the inner hollow cylinder 20 to enable conduit connection to the ends 22, those having skill in the art will recognize other construction of the ends 22 to enable connection to other conduit can be adopted without departing from the scope of the present invention.

Figure 3:
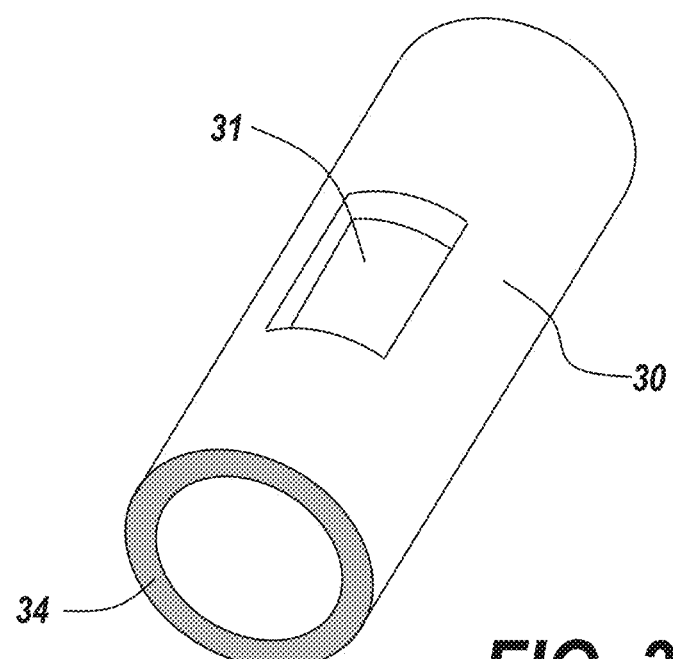
FIG. 3 is an illustration of a perspective view of a center conduit of the modular fluid spray nozzle illustrated in FIG. 1.

As shown in FIG. 3, center hollow cylinder 30 includes a sidewall 34 with a window 31. Window 31 is an aperture that extends through sidewall 34. As shown in FIG. 3, window 31 is shown with a rectangular shape, but in other embodiments, window 31 may be shaped as an oval, trapezoid, or possess a different geometry. When inner hollow cylinder 20 is mated with center hollow cylinder 30, the hole 21 in inner hollow cylinder 20 is placed so as to be aligned with the window 31 of center hollow cylinder 30.

Figure 4:
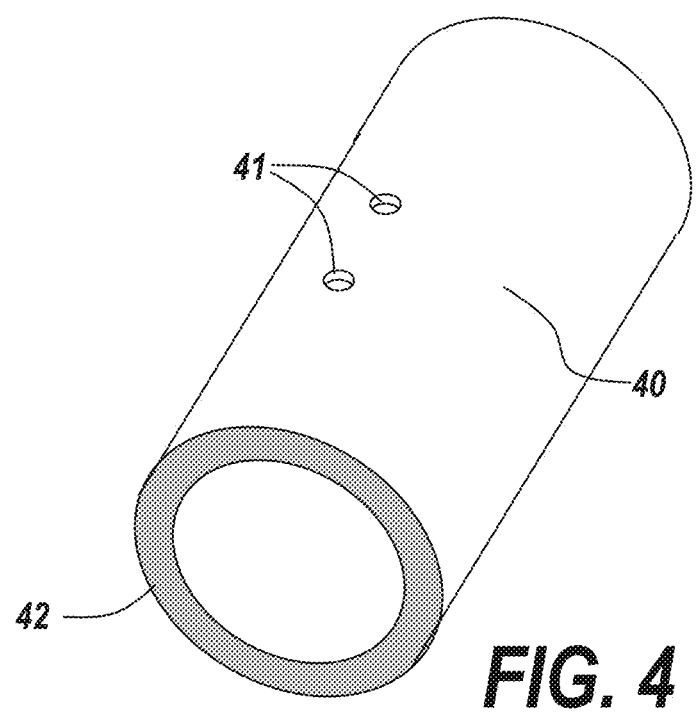
FIG. 4 is an illustration of a perspective view of an outer conduit of the modular fluid spray nozzle illustrated in FIG. 1.

FIG. 4 shows the outer hollow cylinder 40 with two apertures 41 in its sidewall 42. Outer hollow conduit 40 can be made from fire resistant hose which will give protection from heat and flames to the modular fluid spray nozzle 10.

Figure 5:
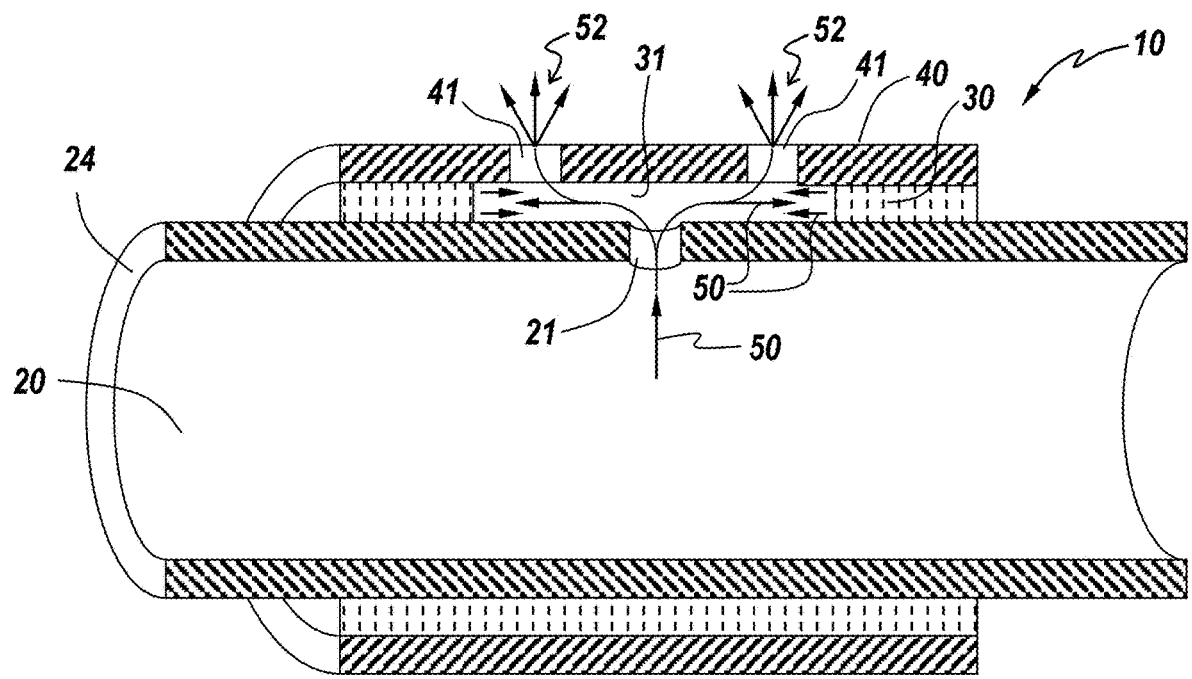
FIG. 5 is an illustration of a cut-away perspective side view of the modular fluid spray nozzle illustrated in FIG. 1 with representations of fluid flow.
Figure 6:
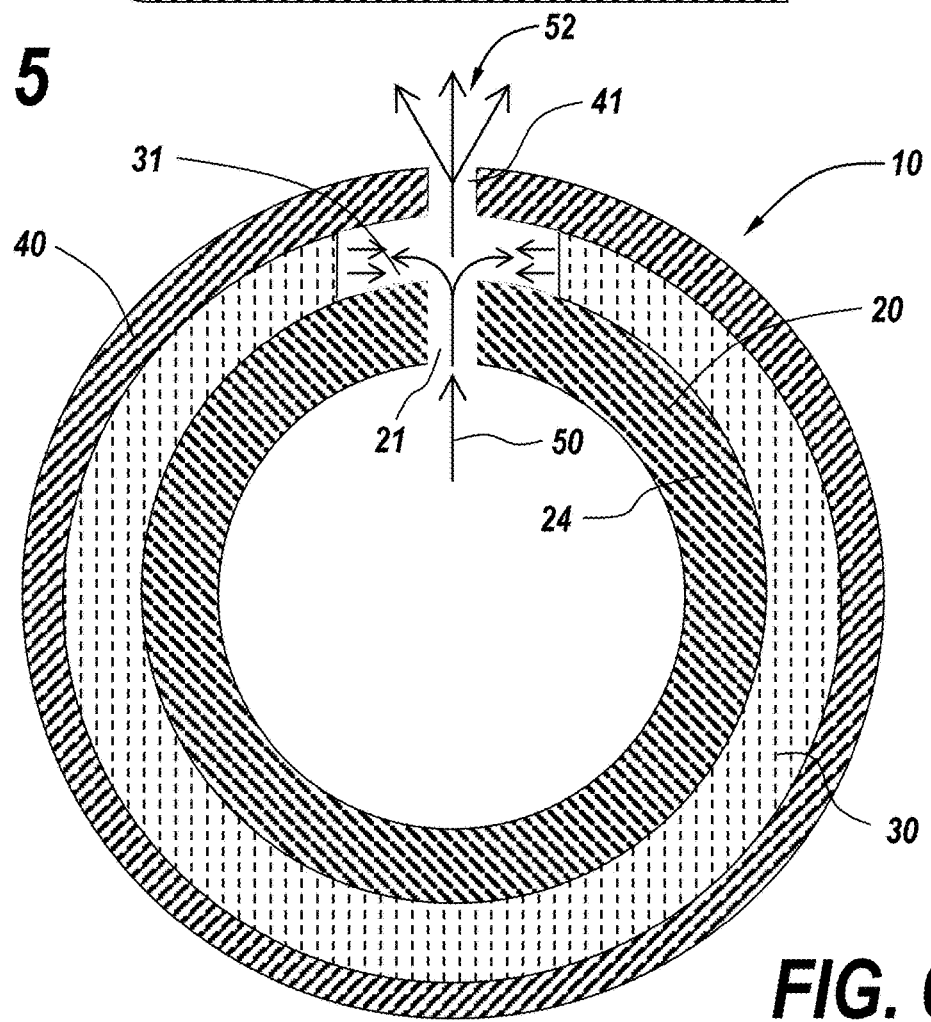
FIG. 6 shows a cross-sectional front view of complete the modular fluid spray nozzle illustrated in FIG. 1 with representations of fluid flow.

FIG. 5 is an illustration of a cut-away perspective side view of the modular fluid spray nozzle illustrated in FIG. 1 with representations of fluid flow. FIG. 6 shows a cross-sectional front view of complete the modular fluid spray nozzle illustrated in FIG. 1 with representations of fluid flow. FIG. 5 and FIG. 6 shows how window 31 from FIG. 3 is bordered with the inner and outer hollow conduits 20, 40 to form a chamber where the liquid flows acquire their unique rectangular spray shape. FIG. 5 shows a cut away view of the assembly of hollow conduits 20, 30, and 40. Some fluid flows from the inside of inner hollow cylinder 20 along flow path 50 and through the hole 21. Since apertures 41, shown in FIG. 5, are axially misaligned with the hole 21, flow path 50 is forced to oscillate inside the window 31. Eventually, the flow path 50 exits apertures 41. A flow pattern 52 has momentum components parallel to the through flow path 50 in inner hollow cylinder 20 when exiting apertures 41.

FIG. 6 is a cross sectional view looking into the inner hollow cylinder 20. FIG. 6 shows that the flow path 50 eventually exits apertures 41 as flow pattern 52. Flow pattern 52 has momentum components perpendicular to the through flow direction in inner hollow cylinder 20 when exiting apertures 41. The result of the parallel and perpendicular momentum components is a rectangular flow pattern 52 that comes out of apertures 41. This flow pattern 52 is very unusual and also very useful.

Figure 7A:
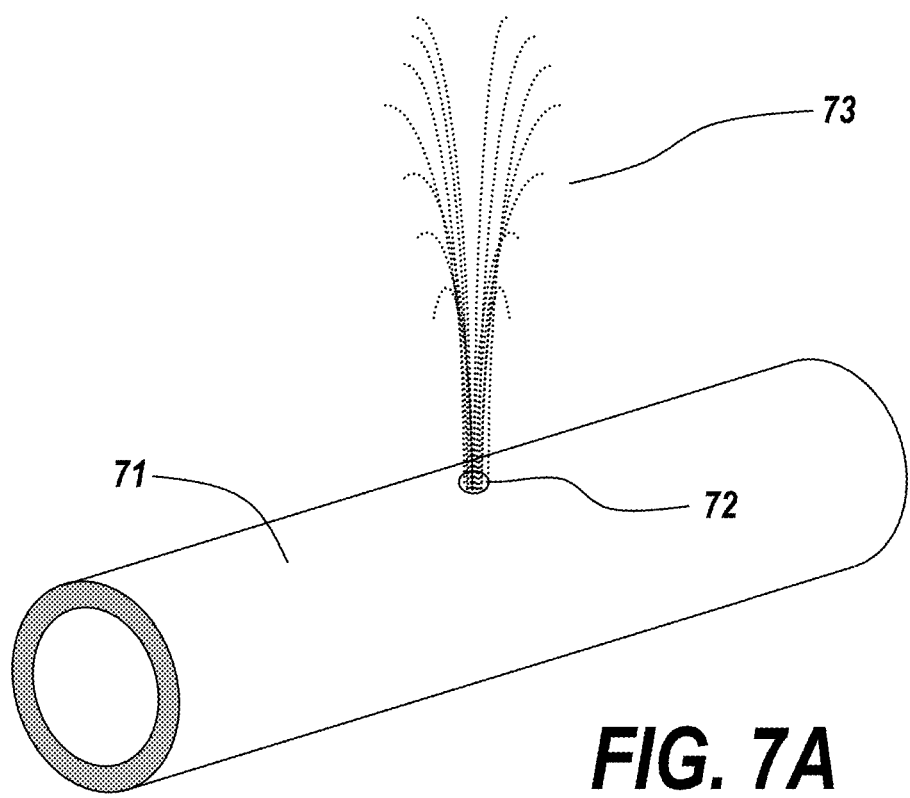
FIG. 7A shows an oblique view of a conduit spraying a stream of fluid from a single hole.

FIG. 7A show a conduit 71 with a single hole 72 spraying a narrow stream of fluid 73 out of the hole 72, as is known in the prior art. The stream 73 will rise very high, but being very narrow, it is not useful for fighting wildfires. Single holes 73 must be placed very close together to get a continuous wall of fluid. Many such holes require too much water to supply from a home or from a tanker truck.

Figure 7B:
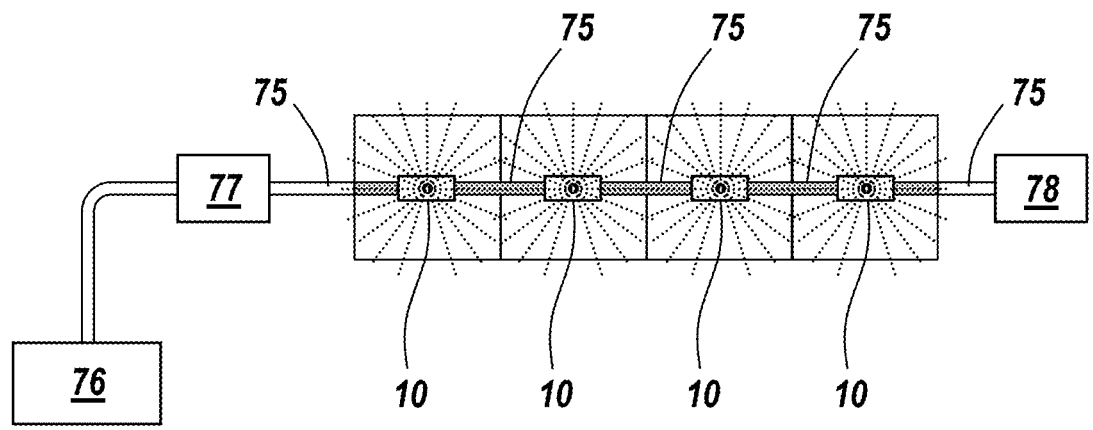
FIG. 7B is a schematic illustration of an array of modular fluid spray nozzles connected to a pump and a water source.

FIG. 7B illustrates an array of modular fluid spray nozzles 10 connected together by approximately identical lengths of a conduit 75 formed from a rigid or flexible material. These nozzles have spray patterns 52 that are superior to the hole 72 in FIG. 7A. The conduit 75 could be PVC piping or flexible hose. Hoses may be secured to the inner hollow cylinder 20 with a hose clamp when a notch 26 is placed in each end 22 of the inner hollow cylinder 20. Flexible hoses may be connected to the ends 22 by other means as well.

PVC conduit can be secured to PVC ends of the modular nozzle by various type of glue. Numerous other configurations and variations are possible. A pump 77 takes water from a fluid source 76, and forces the fluid into the modular fluid hose nozzles 10. At the end of the array of modular fluid spray nozzles 10, an end cap 78 stops the flow of fluid. If the end of the array did not have an end cap 78, then most of the fluid would flow out of the end of the array, and it would be wasted. When the modular fluid hose nozzles 10 are connected together by approximately identical lengths of conduit 75, the rate of fluid flow is quite constant along the array of modular fluid hose nozzles 10. The modular fluid hose nozzles 10 are quite insensitive to pressure drop along the many lengths of conduit 75. This means that the flow rate of fluid out of a modular fluid hose nozzle 10 is quite insensitive to its location in the array. FIG. 7B shows that each modular fluid hose nozzle 10 sprays a uniform, and almost equal, amount of fluid in a large rectangular area which is centered on its corresponding modular fluid hose nozzle 10.

Figure 7C:
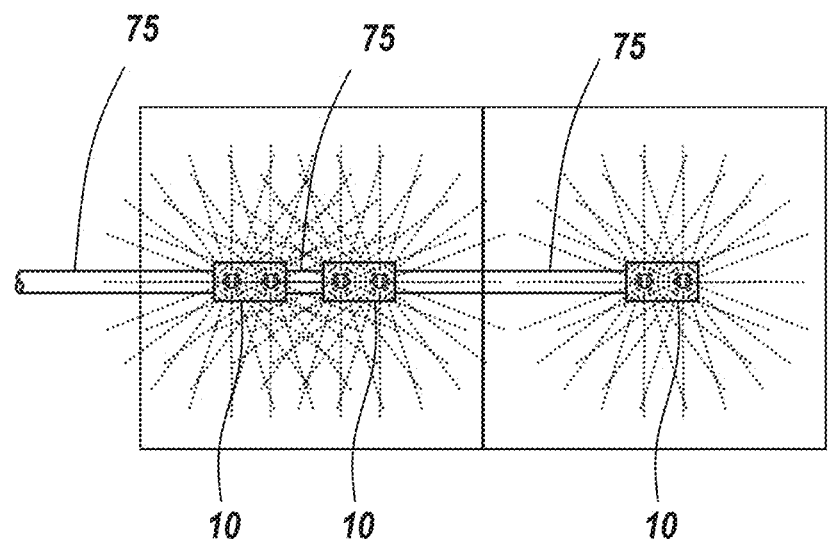
FIG. 7C is a representative illustration of one possible embodiment of modular fluid spray nozzles connected directly together.

FIG. 7C shows that the modular fluid hose nozzles 10 can be connected to each other as well as to a hose or PVC. The modular fluid hose nozzles 10 can have variable spacing that can be decided in the field. In FIG. 7C, the two modular fluid hose nozzles 10 10 on the left are grouped into a closely spaced pair. They can be connected together by a short hose or a PVC connector. The left pair will deliver twice as much water as the single modular fluid hose nozzle 10 on the right, to the same area on the ground. Thus, a protective water barrier can be custom created very quickly in the field such that more vulnerable areas can have more water sprayed on them. The presently disclosed modular fluid spray nozzles 10 provide numerous advantages over previous firefighting devices.

Another method of changing the amount of water that comes out of the modular fluid hose spray nozzle 10 is to change the size of the apertures 41 as shown in FIG. 4. The rectangular area that is wet by a modular fluid hose nozzle 10 is a function of the pressure of the fluid. The higher the pressure, the larger the area sprayed.

An array of modular fluid hose nozzles 10 does not have a significant problem with pressure drop due to friction losses in the hose or conduit. Modular fluid hose nozzles 10 that are farther from the water source have less water flowing through them. This difference is because earlier modules have taken water from the array and sprayed the water. Pressure loss from friction loss in the hose is a function of water flow. The farther modules get less water flow and therefore have less pressure loss per segment.

The disclosed modular fluid spray nozzles 10 can be constructed from relatively inexpensive materials. The disclosed modular fluid spray nozzles 10 provide a low cost alternative for homeowners to protect their homes and other structures from fires. The wide rectangular shape of the spray from modular fluid spray nozzles 10 enables the modular fluid spray nozzles 10 to be spaced many feet apart while still supplying a sufficient amount of water along the array.

Figure 8:
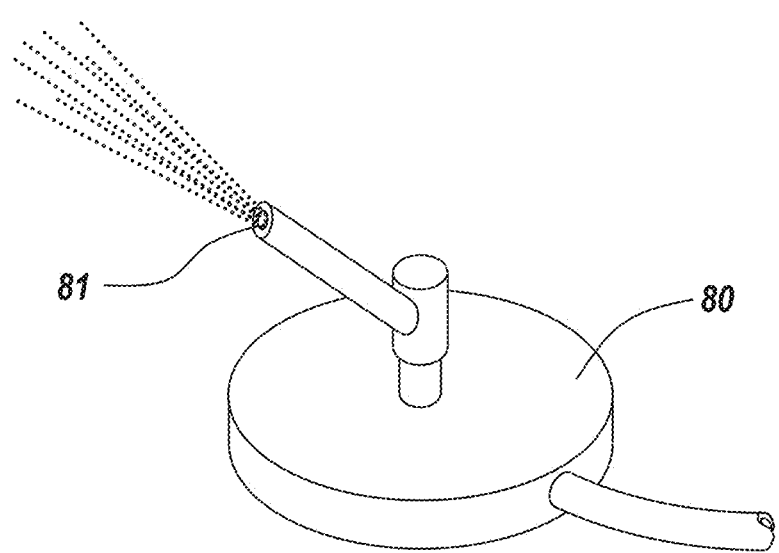
FIG. 8 is an illustration of a perspective view of a lawn sprinkler as is known in the prior art.

FIG. 8 shows a conventional lawn sprinkler 80 that can rotate through 360 degrees or less as is known in the prior art. These types of sprinklers are offered by many companies as a means of protecting a structure.

Figure 9A:
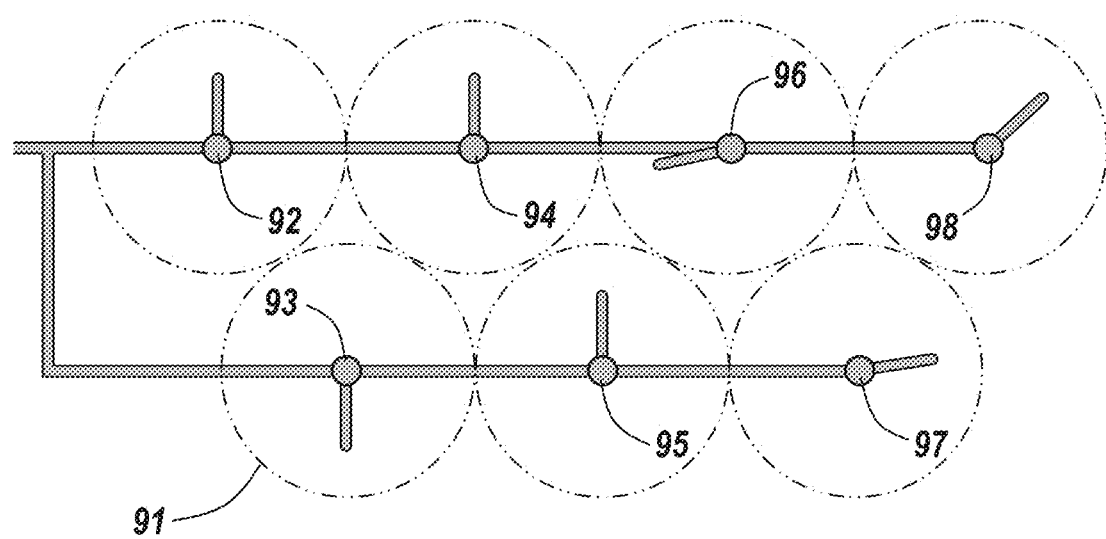
FIG. 9A is an illustration of a topology for an array of conventional sprinklers.
Figure 9B:
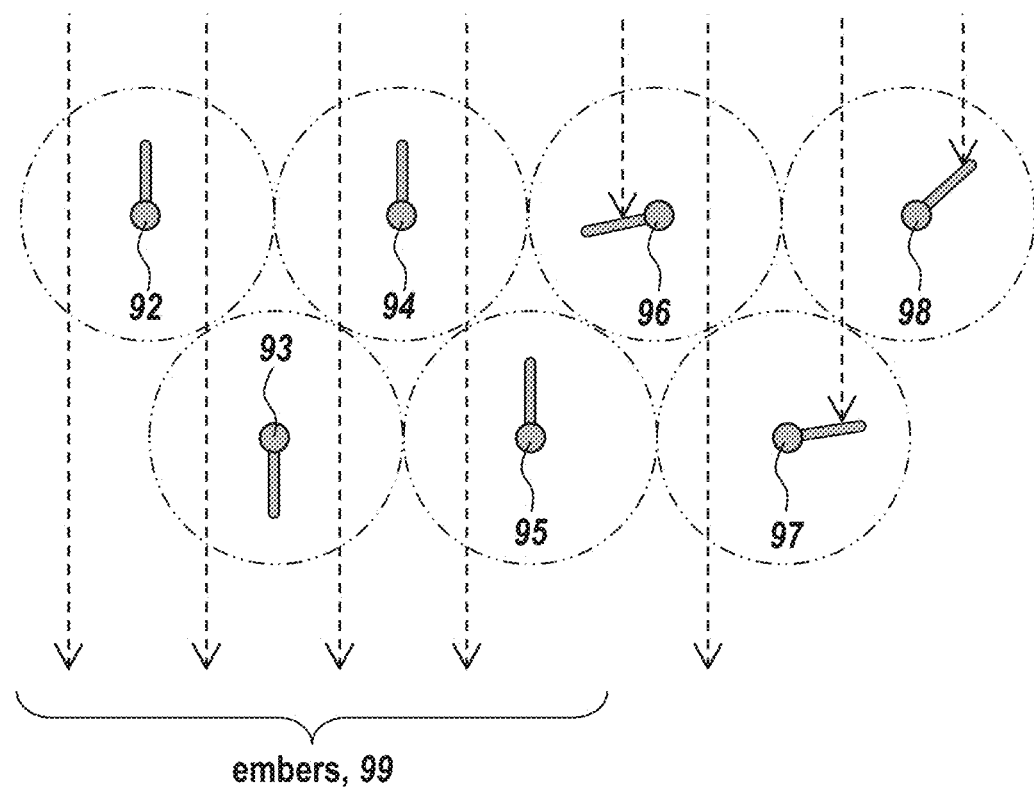
FIG. 9B is an illustration of the topology of the array of conventional sprinklers illustrated in FIG. 9A with the addition of embers permeating the array.

FIG. 9A shows the recommended topology for placement of a group of sprinklers when trying to stop a fire as is known in the prior art. Two rows of sprinklers are needed for the best fluid delivery from an array of sprinklers. Sprinklers 92-98 are shown in FIG. 9A. The circles 91 enclose the areas that have fluid delivered to them. FIG. 9B shows that a prior art sprinkler system cannot reliably prevent flying embers from passing the line of sprinklers. Flying embers are a major cause of homes catching fire. Sprinkler 92 is shown spraying upward. If sprinkler 93 is spraying downward, and Sprinklers 94 and 95 are spraying upwards at the same time, the flying burning embers 99 can get past the left half of the array of sprinklers. The sprinklers cannot be synchronized, and even if they could be synced with each other, there will always be times that embers can blow through sections of the sprinkler array. Compare FIG. 9B to FIG. 7B, which does not provide any gaps in protection.

Figure 10A:
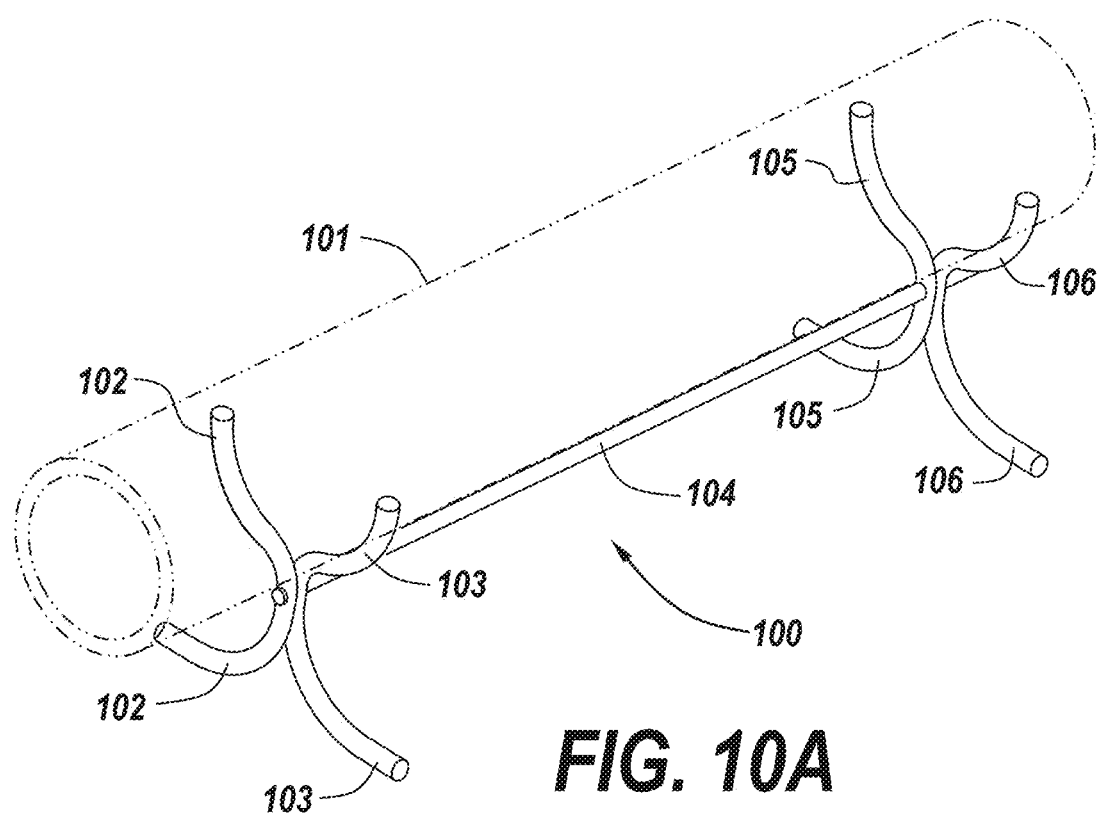
FIG. 10A is an illustration of a perspective view of a conduit support structure with a broken-line representation of where a conduit would rest in the conduit support structure.

FIG. 10A shows a section of conduit 101 that is resting in a conduit support structure 100. It is necessary to control the direction that the spray exits from the modular fluid hose nozzles 10. Sometimes the flow pattern 52 is desired to go straight up, while at other times the flow pattern 52 is desired to go at various other angles relative to the ground. The conduit support structure 100 is used to hold the conduit 101 to direct the flow pattern 52 at any desired angle. The conduit 101 rests inside the arms 102 and 103 in a scissor-like structure. The conduit 101 also rests inside the arms 105 and 106 in a second scissor-like structure. The two scissor-like structures are connected together by the center rod 104. A single scissor might be used, but the scissor pair gives a more secure mechanism for holding the conduit 101 at a steady angle.

Figure 10B:
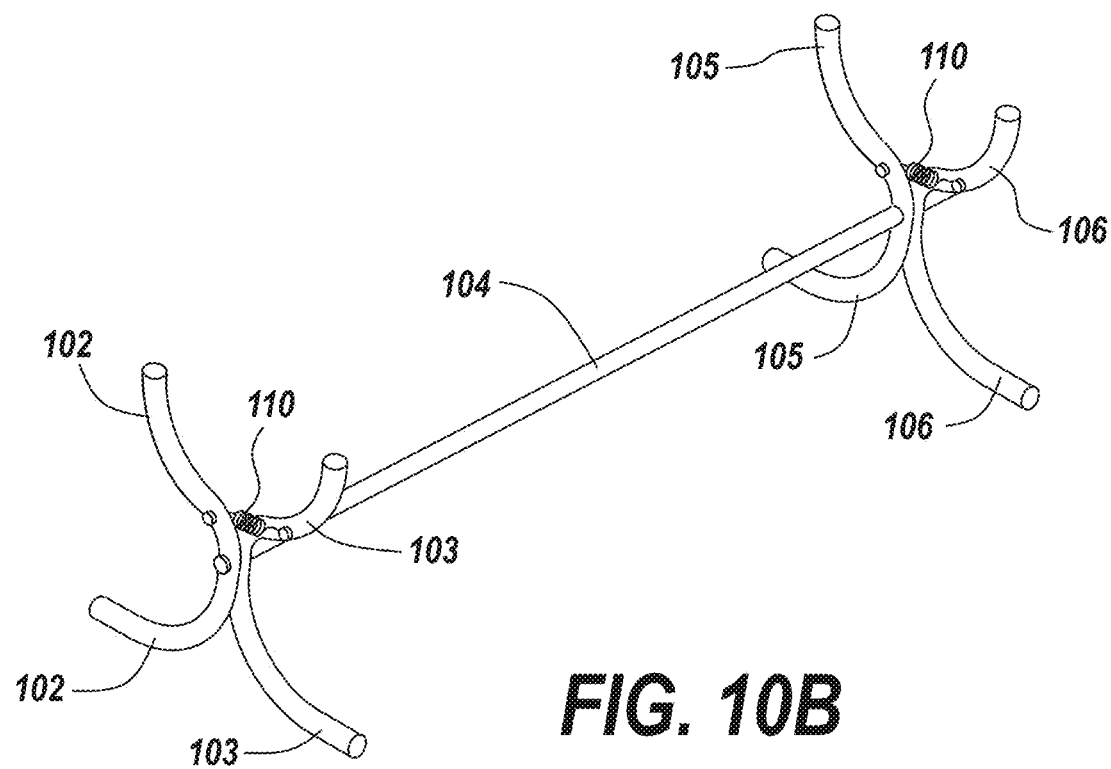
FIG. 10B is an illustration of a perspective view of the conduit support structure of FIG. 10A.

FIG. 10B shows the conduit support structure 100 without a conduit 101 resting in it. A spring 110 at the crossing point of the arms 102 and 103 can be used to bias the arms 102 and 103 and ensure a tighter grip than the normal gravity forces that cause the arms 102 and 103 to grip the conduit 101. A spring 110 can also be used at the crossing point of the arms 105 and 106 to ensure a tight grip.

Figure 11A:
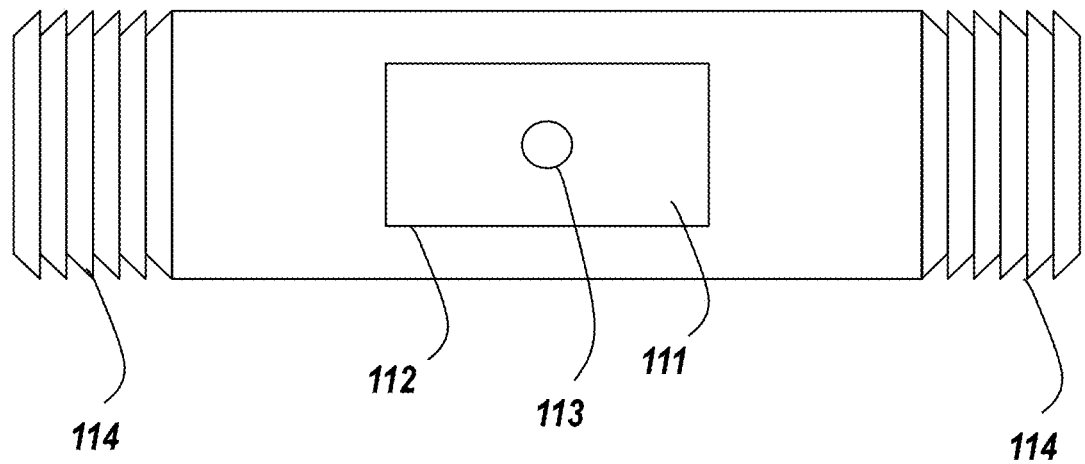
FIG. 11A is an illustration of a top view of a second embodiment of a combination of the components for the modular fluid spray nozzle illustrated in FIG. 1.
Figure 11B:
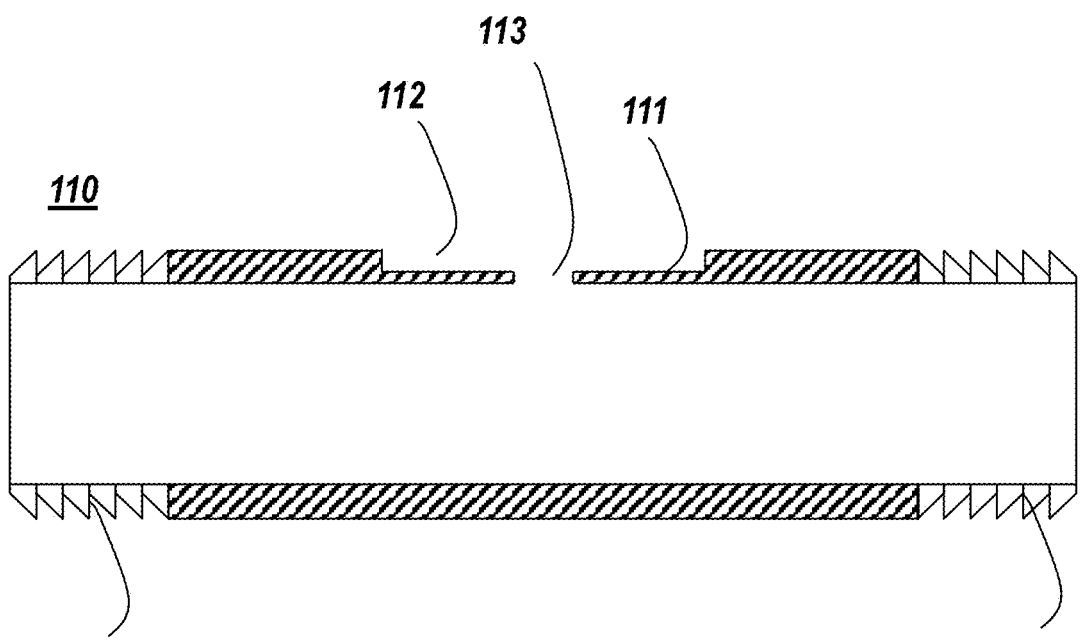
FIG. 11B is an illustration of a cross-sectional side view of the combination of the components illustrated in FIG. 11A, in accordance with a second embodiment of the invention.

FIG. 11A is an illustration of a top view of a combination conduit formed from a combination of the components for the modular fluid spray nozzle illustrated in FIG. 1, in accordance with a second exemplary embodiment of the invention. FIG. 11B is an illustration of a cross-sectional side view of the combination of the components illustrated in FIG. 11A, in accordance with the second exemplary embodiment of the invention. The combination conduit 110 is a hollow conduit that combines the features of the inner hollow cylinder 20 and the center hollow cylinder 30. The combination conduit 110 includes a sidewall 111, comparable to a merger of the sidewalls of the inner hollow cylinder 20 and the center hollow cylinder 30. The combination conduit 110 includes a window 112 and hole 113 comparable to the window 31 and hole 21 illustrated in FIG. 1. The combination conduit 110 receives the outer hollow cylinder 40 of FIG. 4. The outer hollow cylinder 40 can be a fire resistant hose. It can protect at least a portion of the combination conduit 110. As shown in FIG. 4, outer hollow cylinder 40 shows two apertures 41 in its sidewall 42. The outer hollow cylinder 40 is also shown in FIG. 1. The window 112, the outer hollow cylinder 40, and a thin portion of the sidewall 111 create a chamber, comparable to the chamber in FIG. 5. Fluid under pressure enters the chamber through the hole 113 and the fluid oscillates inside the chamber. This oscillation creates the desired spray coming out of the apertures 41 in FIG. 4. At the ends of the combination conduit 110 are hose gripping barbs 114 are used with hose clamps to securely attach hoses to the ends of the combination conduit 110. The notches 26 of FIG. 2 can also be used to secure the hoses.

Figure 12:
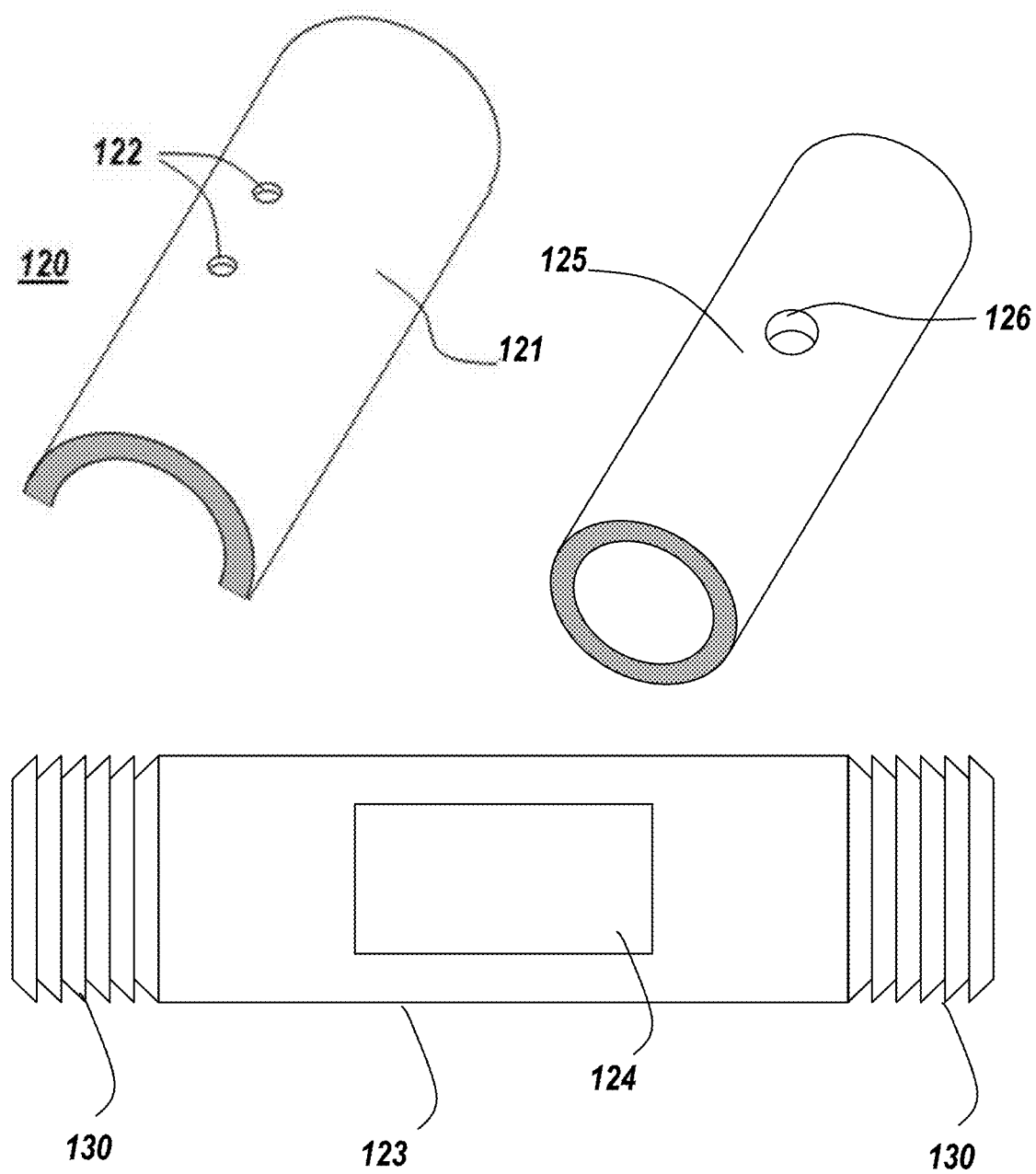
FIG. 12 is an illustration of an exploded view of an alternative conduit combination illustrated in FIG. 1, in accordance with a third exemplary embodiment of the invention.

FIG. 12 shows a conduit combination 120, an exploded view of a third exemplary embodiment of the invention.

Center hollow conduit 123 has window 124 and also hose gripping barbs 130 on each end for attachment to hoses, PVC, or other conduit types. Inner hollow conduit 125 has hole 126, and is placed and adhered inside center hollow conduit 123 such that hole 126 is aligned with the window 124 in center hollow conduit 123. Outer hollow conduit 121 surrounds and is attached to center hollow conduit 123 such that the holes 122 are aligned with the window 124. The outer hollow conduit 121 must be a tight fit in the vicinity of the window 124.

In an alternative design, rather than employing the full outer hollow conduit 121, a small segment of the outer hollow conduit 121 that includes the holes 122 may be adhered across the window 124. Similarly, rather than employing the full inner conduit 125, a segment of the inner conduit 125 that includes the hole 126 can be attached inside center hollow conduit 123 across the window 124 and located such that the hole 126 is aligned with the window 124 of center hollow conduit 123.

As will be understood by one having ordinary skill in the art, there are several different techniques that may be adopted to form the chamber illustrated in FIGS. 5 and 6 and each of these techniques is within the scope of the present disclosure.

What is claimed is:

1. A conduit spray system for fluids, the system comprising:
   an inner sidewall having at least one hole;
   a center sidewall fixed to the inner sidewall and a window formed through the center sidewall, wherein the window is aligned with the at least one hole; and
   an outer sidewall fixed to the center sidewall, wherein the outer sidewall has at least two apertures aligned with the window, wherein a portion of an inner surface of the outer sidewall, the center sidewall forming the window, and an outer surface of the inner sidewall define a chamber that is in fluid communication with the at least one hole, wherein the center sidewall is a hollow cylinder.

2. The system of claim 1, wherein the at least two apertures are axially offset from at least one hole in the inner sidewall.

3. The system of claim 1, wherein at least one of the sidewalls is constructed from PVC.

4. The system of claim 1, wherein at least one of the sidewalls is constructed from a flexible material.

5. The system of claim 1, wherein the center sidewall has two ends.

6. The system of claim 5, wherein one of the two ends is coupled to another conduit spray system.

7. The system of claim 5, wherein one of the two ends is coupled to a flexible hollow cylinder.

8. The modular fluid spray nozzle of claim 5, wherein one of the two ends is coupled to a rigid hollow cylinder.

9. The system of claim 5, further comprising foam and water flowing within the hollow cylinder.

10. The system of claim 5, further comprising a mechanical fastening structure on each of the ends, thereby facilitating connecting the ends to a hose or a conduit.

11. The system of claim 5, wherein each of the two ends are coupled to additional conduit spray systems.

12. The system of claim 5, wherein each of the ends further comprises notches formed in the ends, wherein each of the ends is coupled to a flexible hollow cylinder with a clamp clamping the flexible hollow cylinders to the notches.

13. The system of claim 1, wherein the inner sidewall and the center sidewall are integrally formed.

14. The system of claim 1, further comprising a base holding the sidewalls, wherein the base comprises a scissor-like set of legs, whereby a weight of the sidewalls biases a tighter grip of the scissor-like set of legs.

15. The system of claim 14, wherein the scissor-like set of legs further comprises at least one spring to bias the tighter grip of the scissor-like set of legs.

16. The system of claim 1, wherein at least one of the sidewalls forms a hollow cylinder and at least one of the sidewalls does not form a hollow cylinder.

17. The system of claim 1, wherein the inner sidewall is a rigid hollow cylinder having two ends, the center sidewall is a flexible hose segment fit over the rigid hollow cylinder, and the outer sidewall is a fire-resistant hose segment fit over the flexible hose segment.

18. The system of claim 17, wherein the flexible hose segment is adhesively attached to the rigid hollow cylinder and the fire-resistant hose segment.

19. The system of claim 17, wherein the inner sidewall, the center sidewall, and the outer sidewall are at least one of blow molded, 3D printed, or formed as a single integral entity.

* * * * *